United States Patent [19]

Ely

[11] 3,948,363
[45] Apr. 6, 1976

[54] FRICTION MEMBER ASSEMBLY
[75] Inventor: William Edwin Ely, Troy, Ohio
[73] Assignee: The B. F. Goodrich Company, Akron, Ohio
[22] Filed: Apr. 19, 1972
[21] Appl. No.: 245,425

[52] U.S. Cl. ........... 188/71.1; 188/73.2; 188/251 A; 192/70.14; 192/107 M
[51] Int. Cl.² ..................... F16D 55/00; F16D 69/02
[58] Field of Search ....... 188/251 R, 251 M, 251 A, 188/73.2, 71.1, 71.5; 192/107 M, 70.14

[56] References Cited
UNITED STATES PATENTS

| 2,702,770 | 2/1955 | Steck | 188/251 M |
| 3,118,527 | 1/1964 | Lombardy et al. | 192/107 M |
| 3,526,306 | 9/1970 | Bentz et al. | 188/251 A X |
| 3,552,533 | 1/1971 | Nitz et al. | 192/70.14 X |
| 3,731,769 | 5/1973 | Ely | 192/107 M X |

Primary Examiner—George E. A. Halvosa

[57] ABSTRACT

A friction member assembly for a brake or clutch in which a first flat frictional surface is made up of a sheet of pyrolized cloth and carbonaceous filter material laminated to other sheets of a braking member and an opposing second flat frictional surface is made up of the overlapping edges of laminated sheets of pyrolized cloth and carbonaceous filler material extending obliquely from the frictional surface providing improved operation in the wet and dry condition when the first and second frictional surfaces of the assembly are brought into frictional engagement.

1 Claim, 2 Drawing Figures

FRICTION MEMBER ASSEMBLY

BACKGROUND OF THE INVENTION

Aircraft brakes operate differently under dry and wet conditions because the frictional surfaces of the brake discs have one coefficient of friction in the dry condition and a lower coefficient of friction in the wet condition. To compensate for this reduction in the coefficient of friction in the wet condition, the pressure forcing the discs together must be increased. It has been found that a large difference in the required braking pressure between the wet and dry braking condition is undesirable for two reasons. First, the greater the difference in required braking pressure the more difficult it is to control the application of the lower braking pressures in the dry operating condition. Too much pressure applied in the dry braking condition causes the brake to lock the wheel and results in a loss in braking efficiency. Second, where substantially greater pressures are necessary in the wet braking condition the fluid cylinder and piston assemblies must be enlarged and the entire wheel and brake assembly must be of stronger, heavier construction to withstand the greater stresses. This results in a larger brake construction which is not desirable for aircraft where the weight and space limitations are critical.

SUMMARY OF THE INVENTION

According to the present invention, braking is provided by the frictional engagement of iris type and flat type carbon frictional surfaces. The braking pressure required with this construction in the dry braking condition is no more than is required for the same braking provided by the engagement of two flat type carbon frictional surfaces. However, in the wet braking condition the braking pressure required by the iris-flat type brake is substantially less than the pressure required to obtain the same braking with the flat type brake construction. Accordingly, the iris-flat type brake construction reduces the pressure control requirement on the brake in the dry condition because the difference in pressure required between the wet and dry braking condition of the brake is small enough to permit more precise control. The increase in pressure required for the iris-flat type brake construction in the wet condition is not so great as to require large cylinders and pistons or a larger heavier brake wheel assembly. As a result, skidding due to locking of the brake in the dry braking condition is reduced. Also the lower pressures required for the wet braking condition makes possible a lightweight smaller brake using lightweight economical pressure fluid parts.

The accompanying drawings show one preferred form made in accordance with and embodying this invention and which is representative of how this invention may be practiced.

DETAILED DESCRIPTION

Figure 1:
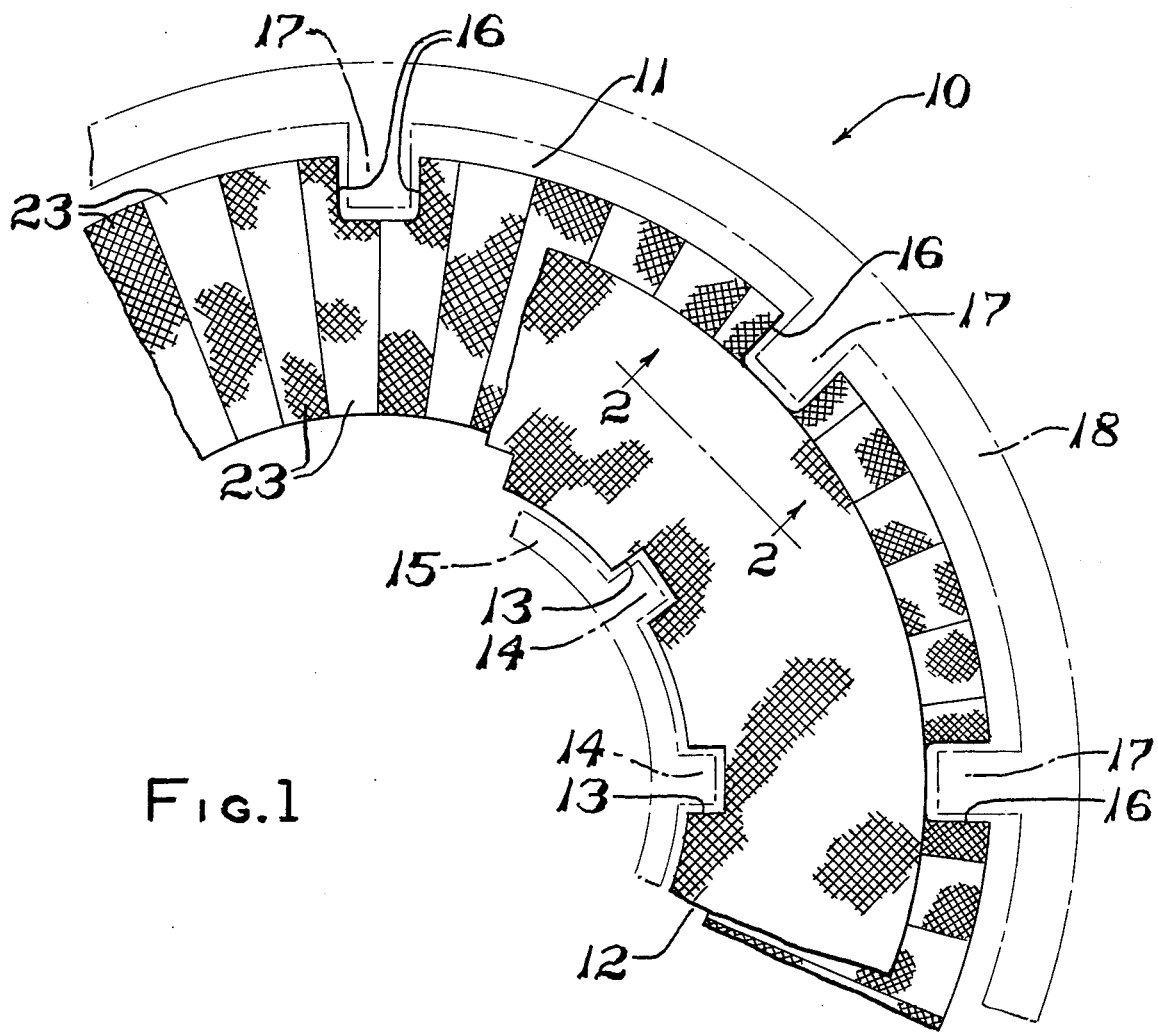
FIG. 1 is a side elevation of a part of an annular friction member assembly (shown in solid lines), certain parts being broken away, and illustrated in torque driving engagement with related parts which, in this example, may be a rotatable wheel and a splined torque tube, the sides of which are represented by the chain-dotted lines.

Referring to FIG. 1, an annular friction mechanism 10 is shown having braking members disposed in spaced-apart positions such as rotatable annular disc 11 and nonrotatable annular disc 12. The nonrotatable annular disc 12 has grooves 13 for engagement with splines 14 of a torque tube 15 shown in chain-dotted lines. The rotatable annular disc 11 has driving lugs 16 at the radially outer edges for engagement with splines 17 of a wheel 18 shown in chain-dotted lines.

Each of the annular discs 11 and 12 are laminated and made up of layers of strips of a carbon composite friction material. The rotatable annular disc 11 has an iris type construction built up from a plurality of segmental strips 19 bonded together by a bond 22, shown more clearly in FIG. 2. The segmental strips 19 are of pyrolized cloth and although several different materials may be used, it has been found that rayon is satisfactory for this application. The strips 19 may be of either graphite cloth or carbon cloth. The process for making this material is well-known in the art and therefore will not be described here.

The fabric of the segmental strips 19 is usually impregnated with a high temperature thermal setting resin or other bonding material such as phenolic which is chosen for its ability to convert into carbon or graphite on pyrolization during a later step in the manufacture of the annular disc. The strips 19 may be in the form of sectors with curved sides at the inner and outer diameters, respectively, and each of the strips may extend circumferentially in an arc from approximately 45 degrees to 180°.

The segmental strips 19 are laid up in a partially overlapping condition with the end edges 23 extending into opposite flat frictional surfaces 24 and 25 of the rotatable annular disc 11. By continuing the overlapping layup of the strips 19, an annular configuration is obtained. As shown in FIG. 1, the end edges 23 extend in a substantially radial direction of the disc 11 and transverse to the direction of rotational movement of the disc. The bond 22 occurs when the annular disc 11 is pyrolized at which time the resin is converted to a char bond of graphite or carbon depending upon the temperatures of pyrolization. It will be seen that the strips 19 extend obliquely to the flat frictional surfaces 24 and 25 and that the overlapping end edges 23 form parallel flat frictional surfaces 24 and 25 on opposite sides of the disc 11.

Figure 2:
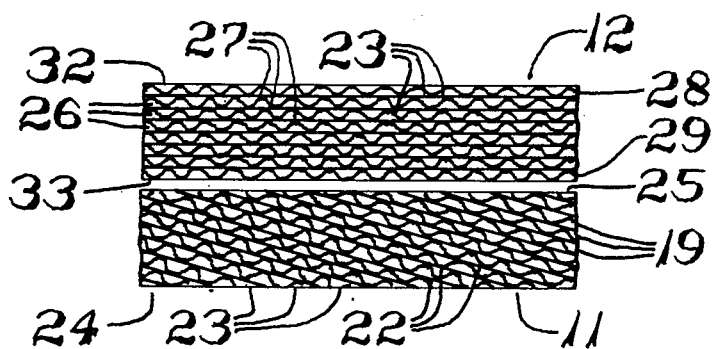
FIG. 2 is an enlarged fragmentary sectional view of the two annular disc members taken along the plane of line 2-2 of FIG. 1.

The nonrotatable annular disc 12 is also laminated and built up from a plurality of annular strips 26 bonded together by a bond 27 in a flat laminated construction shown more clearly in FIG. 2. The nonrotatable annular disc 12 is built up in the same manner and of the same materials as described for the rotatable annular disc 11 except that the annular strips 26 are laid one on top of the other with annular facing strips 28 and 29 forming flat frictional surfaces 32 and 33.

As shown in the drawings, the rotatable annular disc 11 and nonrotatable annular disc 12 are mounted in side-by-side relationship in accordance with conventional aircraft brake practice with pressure means (not shown) for displacing the discs into frictional engagement. Specifically in the embodiment shown, the flat frictional surface 25 of the rotatable annular disc 11 is brought into engagement with the flat frictional surface 33 of the nonrotatable annular disc 12 and accordingly the annular facing strip 29 is engaged by the end edges 23 of the segmental strips 19 of rotatable annular disc 11. There is, therefore, a frictional engagement of the laminated iris type disc 11 with the laminated flat type disc 12.

It has been found in tests conducted on brakes incorporating the above-described friction mechanism where there is frictional engagement of the laminated flat type disc with the laminated iris type disc that substantially improved braking results are obtained as compared to constructions where there is frictional engagement of a laminated flat disc with another laminated flat disc or where there is frictional engagement of a laminated iris type disc with another laminated iris type disc.

Test results illustrating the exceptionally improved braking operation obtained with a brake in which the laminated flat type disc is in frictional engagement with the laminated iris type disc are set forth in the following table:

| Brake with Flat Disc Engaging Iris Disc | | | |
|---|---|---|---|
| Condition of Brake | Dry | Wet | Wet |
| Pressure (psi) | 1000–1200 | 1000–1200 | 1650 |
| Stopping Distance (feet) | 1810.2 | 3510.5 | 2193.6 |
| Stopping Time (seconds) | 20.6 | 37.8 | 22.9 |
| Brake with Flat Disc Engaging Flat Disc | | | |
| Condition of Brake | Dry | Wet | Wet |
| Pressure (psi) | 1000–1200 | 1000–1200 | 2500 |
| Stopping Distance (feet) | 2147.0 | 3766.9 | 2948.8 |
| Stopping Time (Seconds) | 25.1 | 44.0 | 33.7 |
| Brake with Iris Disc Engaging Iris Disc | | | |
| Condition of Brake | Dry | Wet | |
| Pressure (psi) | 1000–1200 | 1000–1200 | |
| Stopping Distance (feet) | 2021.3 | 4169.5 | |
| Stopping Time (seconds) | 24.3 | 57.2 | |

The above tests were performed on conventional brake testing apparatus in which the rotatable annular disc 11 is mounted on a flywheel and the nonrotatable annular disc 12 is mounted on a stationary shaft. The flywheel is rotated at a predetermined speed. Pressure is then applied forcing the discs into frictional engagement. This pressure is maintained until the flywheel is stopped and the time from the instant of pressure application to the time the flywheel is stopped is measured. The distance is measured by measuring the number of rotations of the flywheel and converting this into the distance traveled by the circumference of the flywheel from the time the pressure is applied to the time the flywheel is stopped.

For the tests in the dry condition the discs are brought into frictional engagement without the presence of any added moisture. For the tests in the wet condition, the discs are sprayed or soaked with water prior to being brought into frictional engagement.

The tests for which the data is set forth above were conducted on the brake disc in the dry condition at a pressure in the range of 1,000 to 1,200 pounds per square inch and it will be noted that although the stopping distance and stopping time were best for the flat-iris test, they were also satisfactory for the flat-flat test and iris-iris test.

The next test was a duplication of the first test with the exception that the discs were in the wet condition. The pressure applied was in the range of 1,000 to 1,200 pounds per square inch and it will be noted that the stopping distance increased appreciably as did the stopping time for the flat-iris test and the flat-flat test. The stopping distance and stopping time was the greatest by a substantial amount for the iris-iris test indicating that even if the pressure was increased, the iris-iris brake would not perform as well as the other two brakes.

In the third test, the discs were again operated in the wet condition and the pressure was applied to provide a stopping distance and stopping time which would be acceptable for an aircraft brake. It will be noted that with the flat-iris test, it was only necessary to increase the pressure to 1,650 psi at which time the stopping distance was 2,193.6 feet and the stopping time was 22.9 seconds. On the other hand, with a flat-flat test, it was necessary to increase the pressure to 2500 psi and this produced a stopping distance of 2,948.8 feet in 33.7 seconds which was still greater than that obtained with the flat-iris test.

It is therefore evident that braking with a flat-iris type brake can be obtained with a substantially lower pressure than is necessary with a flat-flat type brake. This means that with the construction of this invention the pressure applying pistons and cylinders need not be greatly increased in size to provide the necessary pressure for braking in the wet condition as is necessary with a brake having flat discs engaging flat discs. Better control of the pressure applying mechanism of the brake is therefore possible which is important in adapting skid control apparatus to the brakes to prevent locking of the wheels. The lower pressure required for braking in the wet condition also makes possible a lighter construction which can be designed to occupy a relatively small space which is important for aircraft applications.

Although the above description of the preferred embodiment of the invention is directed to a flat iris type brake it is contemplated that improved results in accordance with the concept of this invention may be obtained with other surface combinations. For example, the carbon frictional surfaces in frictional engagement may have different compositions such as different woven patterns of the pyrolized cloth in the annular discs which will provide another surface combination.

I, therefore, particularly point out and distinctly claim as my invention:

1. A friction mechanism such as a brake having rotatable and nonrotatable disc members with flat frictional surfaces, a first disc member comprising an annular body of laminated strips of high temperature material bonded together, each of said strips extending in substantially parallel planes circumferentially of said disc with one of said strips forming a frictional surface of said first disc member, a second disc member comprising a body having a second flat frictional surface and a plurality of laminated partially overlapping strips of high temperature material bonded together, each of said partially overlapping strips extending obliquely away from said second frictional surface and said second frictional surface being formed by overlapping ends of said partially overlapping strips extending obliquely away from said second frictional surface, said overlapping ends extending substantially radially of said second disc, means for displacing said frictional surfaces of said braking disc members into face-to-face frictional engagement whereby said strip forming a frictional surface of said first disc member will be engaged by said overlapping ends of said overlapping strips of said second disc member during the braking operation, said strips of said second disc member extending circumferentially and being laid up in overlapping relationship with one end of each strip forming a portion of said second flat frictional surface and the other end of said strip forming a portion of an opposite flat frictional surface on the other side of said second disc member whereby this surface may be engaged by another disc member having the construction of said first disc member upon displacement into face-to-face frictional engagement with said friction surface on the opposite face of said second disc member and said strips of high temperature material being sheets of pyrolized cloth and carbonaceous filler material.

* * * * *